Jan. 6, 1970

J. H. GILBERT 3,488,746

PROCESS FOR THE PRODUCTION OF A FOAMED
POLYETHYLENE LAYFLAT TUBE

Filed Oct. 11, 1966

INVENTOR.
John Harold Gilbert
BY James M. Mason
ATTORNEY

United States Patent Office 3,488,746
Patented Jan. 6, 1970

3,488,746
PROCESS FOR THE PRODUCTION OF A FOAMED POLYETHYLENE LAYFLAT TUBE
John Harold Gilbert, Chepstow, England, assignor to Monsanto Chemicals Limited, London, England, a British company
Filed Oct. 11, 1966, Ser. No. 585,983
Claims priority, application Great Britain, Oct. 28, 1965, 45,658/65
Int. Cl. B29d 23/04; B29h 7/20
U.S. Cl. 264—53                                   16 Claims

ABSTRACT OF THE DISCLOSURE

A blow-extrusion process which comprises extruding a foamable polyethylene resin composition through an annular die having three annular zones successively traversed by the flowing resin, the first zone being a substantially parallel one long enough to establish the back pressure required in the die, the second zone comprising a restriction having a short land, and the third zone being divergent so as to allow foaming and expansion of the resin; inflating the tube thus formed with a fluid under pressure; and flattening the inflated tube. The layflat tube formed by the process is substantially free of wrinkles, corrugations, and thickness variations. It can be used as such, i.e., as a double thickness of foamed resin sheet, or it can be slit longitudinally and opened out into a single sheet.

---

Figure 1:
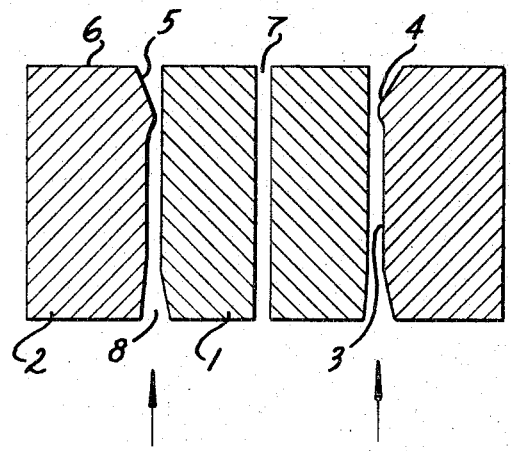

This invention relates to foamed resins, and particularly to a new extrusion process for the production of foamed resin sheets.

Foamed resins have recently become of increasing importance, particularly for such applications as thermal insulation and packaging, and for these it is often desirable for the foamed resin to be in the form of a sheet. Foamed polystyrene sheets have for example been made by slicing a block of foamed polystyrene, and it has been proposed to produce a thin foamed polystyrene sheet by extruding a foamable polystyrene composition. Methods of this kind for making foamed polystyrene sheets, however, are difficult to apply to the production of foamed polyethylene materials. We have now developed a process of blow-extrusion by which there can be produced foamed polyethylene sheet of high quality in the form of "layflat" tube. A layflat tube of a resin material can be obtained by a process in which the resin is extruded through an annular die to form a tube, the end of this tube is closed, and a fluid is introduced into the tube under pressure so as to distend it; the resulting layflat tube can be slit longitudinally and opened out, or flattened so as to form a sheet of double thickness.

The process of the invention is one for the production of a foamed polyethylene layflat tube, in which a foamable polyethylene resin composition is extruded through an annular die so as to form a tube of foamed resin and this is maintained as a tube by means of a fluid under pressure, in which the die has three annular zones traversed in succession by the flowing resin, the first zone comprising a substantially parallel one long enough to establish the back pressure required in the die, the second zone comprising a restriction having a short land (the dimension in the direction of extrusion), and the third zone being divergent so as to allow foaming and expansion of the resin.

The improvement obtained is particularly noticeable where the foamed resin sheet has a relatively low density, and blow-extruded foamed polyethylene sheet that is substantially free of wrinkles, corrugations or thickness variations, and has a density not greater than 5 pounds per cubic foot, such as about 2 pounds per cubic foot, is new and is accordingly part of the invention. The sheet can be in the form of a layflat tube as produced, or in the form of a single flat sheet.

The die is an annular one, and although the annulus is preferably circular it can have a different shape, for example, elliptical. The inlet to the die can, if desired, be slightly enlarged so as to facilitate the flow of resin into the die, and in the first zone (which is substantially parallel) of the die proper there can in fact be a slight taper narrowing from the back towards the front of the die. Often, however, in the first zone the cross-section is constant, and this condition is most easily satisfied by arranging for this portion to be formed by two cylindrical surfaces mounted concentrically one within the other. A "spider" or similar support is necessary for mounting the inner surface, and this needs to be placed sufficiently far away from the outlet of the die for it to have no adverse effect, such as a tendency to form weld lines or other weaknesses, on the extruded resin. The diameter of the annulus depends mainly on the size the extruded tube is to have, and can for instance be from ¼ inch to 2 feet and often from 1 inch to 1 foot. The width of the annulus in the first zone of the die (that is to say the width of the space between the two surfaces defining this portion) is preferably from 0.01 to 0.05 inch, for example about 0.025 inch. As explained above, there can be a slight taper here, but normally the width at any given point of the first portion is within the above limits. The land of this portion is preferably at least 0.3 inch, for example from 0.5 to 2 inches.

The next zone of the die traversed by the flowing resin is restricted, for example at the apex of a tapering first portion as explained above or by the presence of a circumferential protuberance on either or both of the cylindrical surfaces; it is preferable to avoid a sharp discontinuity between these two portions. The width of the annulus at this restricted portion is normally from 0.2 to 0.9 times, and preferably from 0.4 to 0.8 times, the width at the first portion. The land of the restricted portion is short, for example from zero up to 0.2 inch, such as from 0.05 to 0.1 inch.

The final zone of the die is divergent and a simple way of arranging this is to chamfer away the edge of either or both of the cylindrical surfaces at the die outlet; preferably at least the outer surface has its edge chamfered in this way. The included angle between the two surfaces defining this portion is preferably between 10° and 40°, for example between 10° and 30°. The angle can if desired become greater or smaller towards the die outlet so that a longitudinal cross-section is convex or concave respectively. The land of the third zone is preferably from 0.05 to 0.2 inch. The third zone of the die is preferably so arranged that the extruding resin issues in a direction having an outward radial component, and an example of a die constructed in this way is shown in FIGURE 2 of the accompanying drawings and described in detail later in this specification.

Provision needs to be made for inflating the extruded tube with a fluid (usually air) under pressure, and for this purpose it is convenient to pass the fluid through a duct drilled axially through the centre of the die; the fluid connection, like the spider mounting mentioned earlier, needs to be situated well to the rear of the die so as to avoid difficulties due to interference with the resin flow.

Figure 2:
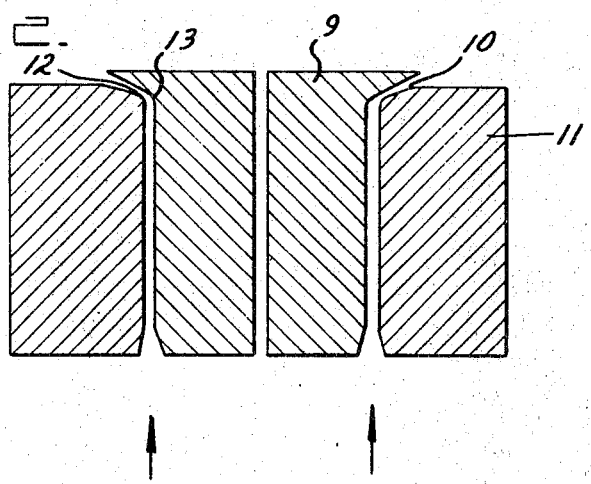

The essential parts of the two examples of dies according to the invention are illustrated (not to scale) in section in FIGURES 1 and 2 respectively of the drawings accompanying the specification.

The die shown in FIGURE 1 comprises a mild steel cylinder 1, 1.5 inches in diameter and 0.85 inch long, mounted concentrically within a hollow mild steel cylinder 2 having its internal surface shaped as shown with a cylindrical portion 3, 0.5 inch long and of internal diameter 1.54 inches, a circumferential protuberance 4 of internal diameter 1.53 inches, and a chamfered edge 5 that directly adjoins the protuberance and is inclined at an angle of 30° to the cylindrical portion, the distance between the largest part of the protuberance and the face 6 of the die being 0.15 inch. The two cylinders have means (not shown) for mounting them concentrically one inside the other on the front end of an extruder so that a foamable polyethylene resin can be extruded through the annular space between them in the direction of the arrows and thence out into the atmosphere so as to produce a tube of foamed resin. A duct 7 is drilled through the centre of the cylinder 1 and connected to a compressed air inlet (not shown) so that air can be blown into such a foamed resin tube. The inlet to the annular space is slightly enlarged at 8 so as to facilitate the flow of resin into the die, but the cross-section of the annular space is constant along the cylindrical portion 3, restricted at the protuberance 4 and divergent at the chamfered edge 5.

In the die shown in FIGURE 2, the inner cylinder 9 is mushroom-shaped as shown, and the edge 10 of the outer cylinder 11 is chamfered to a greater degree than that of the outer cylinder 2 of the die shown in FIGURE 1, so that a resin being extruded from the die issues in a direction having an outward radial component. The corners 12 and 13 in the outer and inner cylinders are rounded, but the corner 12 of the outer cylinder comes close to the surface of the inner cylinder so that there is a restriction (0.015 inch wide) in the cross-section of the die at this point.

The polyethylene resin is preferably of the low density type, although high density material can be employed if desired.

The polyethylene resin used in the process is of course foamable, and this means that it is in admixture with a blowing agent which is preferably a gas or vapour under normal atmopsheric conditions but which can be a volatile liquid. In many cases, the blowing agent is one that is normally gaseous but which while under pressure before extrusion will be present in solution in the molten or semi-molten resin. Examples of volatile substances that can be used include lower aliphatic hydrocarbons such as ethane, propane, butane or pentane, lower alkyl halides such as methyl chloride, trichloromethane or 1,2-dichlorotetrafluoroethane, and inorganic gases such as carbon dioxide or nitrogen. The low aliphatic hydrocarbons, especially butane or isobutylene, are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3 to 30% especially from 7 to 20% by weight based on the weight of the resin is often a suitable proportion of blowing agent, and for example the use of from 7 to 15% by weight of butane in conjunction with polyethylene has given excellent results. Often the use of amounts of blowing agent at the lower end of the above range results in the production of a thicker sheet.

Sometimes the blowing agents is employed in conjunction with a nucleating agent, which assists in the formation of a large number of fine cells. A wide range of nucleating agents can be employed, including finely divided inert solids such as for example silico or alumina (if desired in conjunction with zinc stearate), or small quantities or a substance that decomposes at the extrusion temperature to give a gas can be used. An example of the latter class of nucleating agents is sodium bicarbonate, if desired in conjunction with a weak acid such as for example tartaric or citric acid. A small proportion of the nucleating agent, for example up to 5% by weight of the resin, is usually effective.

The extrusion temperature (that is the temperature of the die and the resin within it) depends to some extent on the softening point of the polyethylene resin, and the thickness of sheet desired. Lower temperatures are preferred for producing thicker sheets, but in general temperatures between 95° C. and 180° C., preferably between 100° C. and 160° C. are suitable. For example, when foamable low density polyethylene is being extruded a temperature in the range of 95° C. to 110° C. is often very suitable. Preferably the outlet of the third zone of the die is cooled so that there is a temperature difference, for instance up to 30° C., in the extrusion direction across the third zone. Air or water cooling can for example be employed for this purpose. The surface temperature of the third zone is then lower than the temperature of the die as a whole and of the melt temperature of the resin.

Extrusion pressures for example greater than 250 pounds per square inch, and especially between 250 and 5000 pounds per square inch, can be employed. Preferably the pressure is between 300 and 2000 pounds per square inch.

In carrying out the process, the foamed resin tube issuing from the die is inflated and distended by means of a fluid under pressure, the tube being nipped together by means of rollers at a suitable distance from the die. Preferably the fluid is a gas, particularly air, although another gas such as for instance nitrogen or carbon dioxide, or even a liquid that has no adverse effects, such as for example water, can be used if desired. The pressure of the fluid within the tube of course depends on the degree of distension required; generally it is not more than a few pounds per square inch gauge and the correct pressure for any particular instance can easily be found by experiment. The degree of distension depends partly on the dimensions desired for the product, but usually the degree of distension is such that the distended tube has a diameter that is not more than 4 or 5 times the diameter of the die annulus, and is preferably from 1.5 to 3 times. For example, an extruded tube of foamed polyethylene can usefully be distended to a diameter up to twice the die diameter.

The inflated tube can if desired be passed over one or more shaping and sizing mandrels, particularly shortly after it leaves the die, or it can be cooled or heated by for example currents of cold or hot air whilst it is being distended. It is normally flattened between a pair of rollers so as to trap the distending fluid, and the resulting layflat tube is wound on a driven take-up roller. If desired the take-up roller can be driven at a speed faster than that merely required to take up the flattened tube so that the latter is stretched longitudinally by a factor of up to 2, for example, from 1.1 to 1.5.

The layflat tube consists of a double thickness of the foamed resin sheet. It can be used as such, for example in the production of bags, or slit longitudinally and opened out to a single sheet useful as a wrapping, packaging or insulating material, or where of an appropriate thickness, for example about 0.1 inch, as a garment stiffener.

The process of the invention is particularly applicable to the production of foamed resin sheet having a density of up to 10 pounds per cubic foot, for example from 1 to 6 pounds per cubic foot, and especially between 1 and 4 pounds per cubic foot. The thinner sheets, such as those about 0.007 inch thick, resemble paper in some ways, particularly foamed sheets having for example a density in the range of 8 to 10 pounds per cubic foot.

The thickness of the sheet, and here reference is being made to a "single" thickness, can be chosen from within a wide range. The thickness of a sheet can for example be from slightly more than 0.003 inch to 0.25 inch and preferably is from 0.01 inch to 0.15 inch.

The invention is illustrated by the following examples.

EXAMPLE 1

This example describes a foamed polyethylene sheet and its production by a process according to the invention.

A foamable polyethylene composition containing approximately 15% by weight of butadine and 5% by weight of silica was extruded at a temperature of 98° C. and at a linear speed of 15 feet per minute through the die described above and illustrated in FIGURE 1 of the drawings accompanying the specification. The resulting tube was flattened between a pair of rollers situated 8 feet from the die and wound on to a driven take-up roller, and compressed air at a pressure of a few pounds per square inch gauge was injected into it through the duct 7, the pressure being maintained approximately constant by a limiting valve. The tube was thus distended to a diameter of about 3 inches so that it was stretched sideways by a factor of 2, and the speed of the take-up roller was adjusted so as to keep pace with the rate of extrusion without stretching the tube longitudinally.

There was produced a flexible sheet consisting of a layflat tube slightly less than 4½ inches wide having a double thickness of foamed polyethylene of density 3 pounds per cubic foot and having a fine cell structure that was partly open and partly closed, the average cell diameter being 0.01 inch. It had a lustrous surface, was free of wrinkles, corrugations and thickness variations and had a total thickness of 0.1 inch. When slit longitudinally it could be opened out into a sheet 9 inches wide and 0.05 inch thick which could be used for example as a packaging material or as a lining or stiffener for clothing.

Attempts to carry out a similar extrusion using a simple annular die resulted in the formation of a badly corrugated sheet.

EXAMPLE 2

This example describes a somewhat thicker foamed polyethylene sheet and its production by a process according to the invention.

A foamable polyethylene composition containing approximately 10% by weight of butane was extruded through the same die and under conditions similar to those described in Example 1.

The result was a sheet consisting of a flattened flexible foamed polyethylene layflat tube having a density 3½ pounds per cubic foot and a total thickness of 0.25 inch. The cell structure was substantially closed and rather coarser than that of the product in Example 1. The surface contained small wrinkles of maximum amplitude 0.02 inch but the sheet was free from large wrinkles, corrugations and thickness variations. When slit longitudinally it could be opened out into a sheet 0.125 inch thick of which the cell structure was clearly visible when it was viewed by transmitted light.

The sheet was useful as a packaging material or as a lining or stiffener for clothing.

EXAMPLE 3

This example describes a thinner foamed polyethylene sheet and its production by a process according to the invention.

A foamable polyethylene composition containing approximately 10% by weight of butane (containing dissolved nitrogen at an equilibrium pressure of 800 pounds per square inch) and 5% by weight of silica was extruded through the same die and under conditions similar to those described in Example 1, the air pressure within the tube being maintained so that the tube was distened by a factor of 2½ and the take-up roller speed being adjusted so as to keep pace with the rate of extrusion.

The resulting flattened tube was slit longitudinally and opened out into a flexible foamed polyethylene sheet of thickness 0.02 inch, free from wrinkles, corrugations and thickness variations and having a density 4 pounds per cubic foot and a fine substantially closed cell structure enclosed on both sides by a thin surface skin. It was semi-transparent, had a lustrous appearance and a leathery feel and resembled in some ways a tough flexible paper. The cell walls gave the sheet a fibrous appearance when it was viewed by transmitted light.

The sheet was useful as a paper substitute and as a packaging material.

When attempts were made to carry out a similar extrusion using a simple annular die the result was unsatisfactory owing to wrinkles that appeared in the extrudate as it left the die, resulting in the product having a number of thick ribs.

What is claimed is:

1. A process for the production of a foamed polyethylene layflat tube substantially free of wrinkles, corrugations, and thickness variations, which comprises (1) extruding a foamable polyethylene resin composition through an annular die having three annular zones traversed in succession by the flowing resin, the first zone being a substantially parallel one of 0.5 to 2″ in length whereby the back pressure required in the die is established, the second zone comprising a restriction having a land of 0.05 to 0.1″, and the third zone, which is 0.05 to 0.2″ in length, being divergent so as to allow foaming and expansion of the resin to form a tube (2) inflating the extruded tube with a fluid under pressure, and (3) flattening the inflated tube.

2. A process according to claim 1, in which the foamed resin sheet has a density from 1 to 6 pounds per cubic foot.

3. A process according to claim 1 in which the first zone of the die is formed by two cylindrical surfaces mounted concentrically one within the other.

4. A process according to claim 1, in which the width of the annulus in the first zone of the die is from 0.01 to 0.05 inch.

5. A process according to claim 1, in which the width of the annulus at the restricted zone is from 0.4 to 0.8 times the width at the first zone.

6. A process according to claim 1 in which the included angle between the two surfaces defining the final zone of the die is between 10° and 30°.

7. A process according to claim 1 in which the third zone of the die is so arranged that the extruding resin issues in a direction having an outward radial component.

8. A process according to claim 1 in which the foamable resin composition comprises as a blowing agent a lower aliphatic hydrocarbon.

9. A process according to claim 1 in which the extrusion temperature is between 100° C to 160° C.

10. A process according to claim 1 in which the outlet of the third zone of the die is cooled so that there is a temperature difference in the extrusion direction across the third zone.

11. A process according to claim 10 in which the temperature difference is up to 30° C.

12. A process according to claim 1 in which the extrusion pressure is between 250 and 5000 pounds per square inch.

13. A process according to claim 12 in which the extruded tube is distended by a factor of from 1.5 to 3.

14. A process according to claim 13 in which the extruded tube is stretched longitudinally by a factor of up to 2.

15. A process according to claim 1 wherein the blow-extruded foamed polyethylene sheet is substantially free of wrinkles, corrugations or thickness variations, and has a density not greater than 5 pounds per cubic foot.

16. The process of claim 1 wherein the layflat tube is slit longitudinally and opened out into a sheet.

References Cited

UNITED STATES PATENTS

| | | | |
|---|---|---|---|
| 2,720,680 | 10/1955 | Gerow | 264—209 XR |
| 3,309,443 | 3/1967 | Scott et al. | |
| 3,339,235 | 9/1967 | Nossol. | |
| 2,452,080 | 10/1948 | Stephenson | 264—95 XR |
| 2,848,747 | 8/1958 | Dixon. | |
| 2,917,217 | 12/1959 | Sisson | 264—47 XR |
| 3,151,192 | 9/1964 | Jacobs et al. | 264—53 |
| 3,160,688 | 12/1964 | Aykanian et al. | 264—53 |
| 3,194,864 | 7/1965 | Richie | 264—51 |
| 3,287,477 | 11/1966 | Vesilind | 264—53 |

FOREIGN PATENTS

| | | |
|---|---|---|
| 291,940 | 7/1965 | Netherlands. |
| 1,171,147 | 5/1964 | Germany. |

OTHER REFERENCES

Collins, F. H. "Controlled Density Polystyrene Foam Extrusion." In SPE Journal, July 1960, pp. 705–709, copy in 264-53.

PHILIP E. ANDERSON, Primary Examiner

U.S. Cl. X.R.

18—14; 260—2.5; 264—95, 209